(No Model.) 3 Sheets—Sheet 2.
J. W. RICKER & T. S. LEWIS.
CORN SHELLER.
No. 253,629. Patented Feb. 14, 1882.
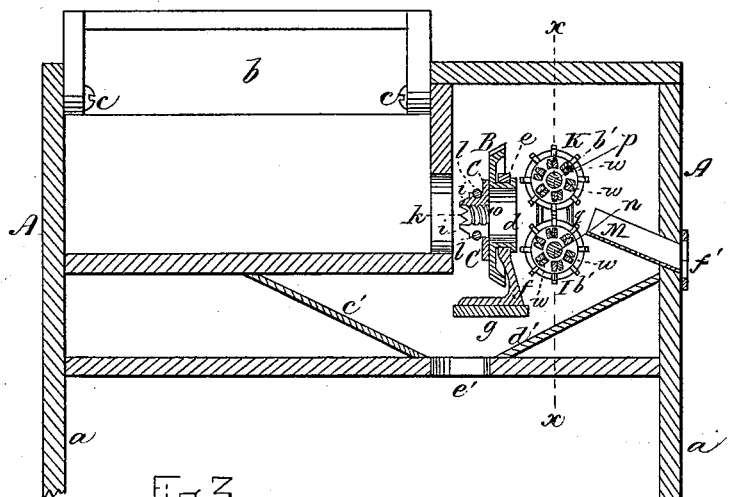
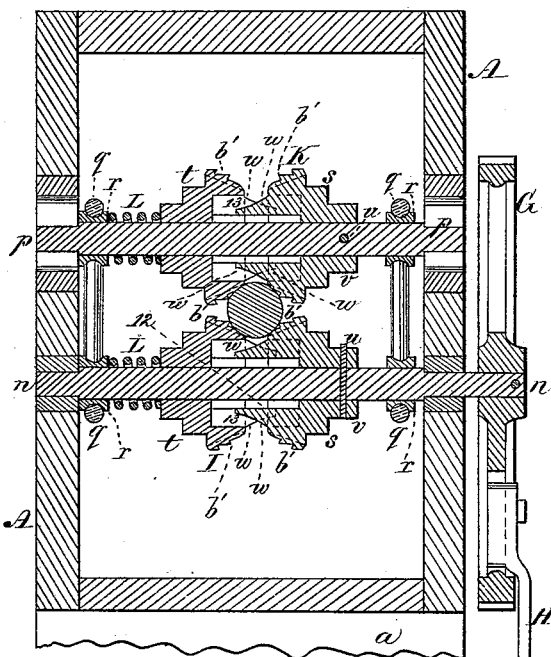
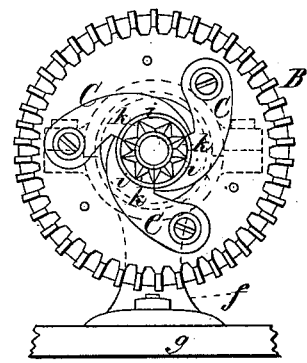
WITNESSES
INVENTORS (No Model.) 3 Sheets—Sheet 3.

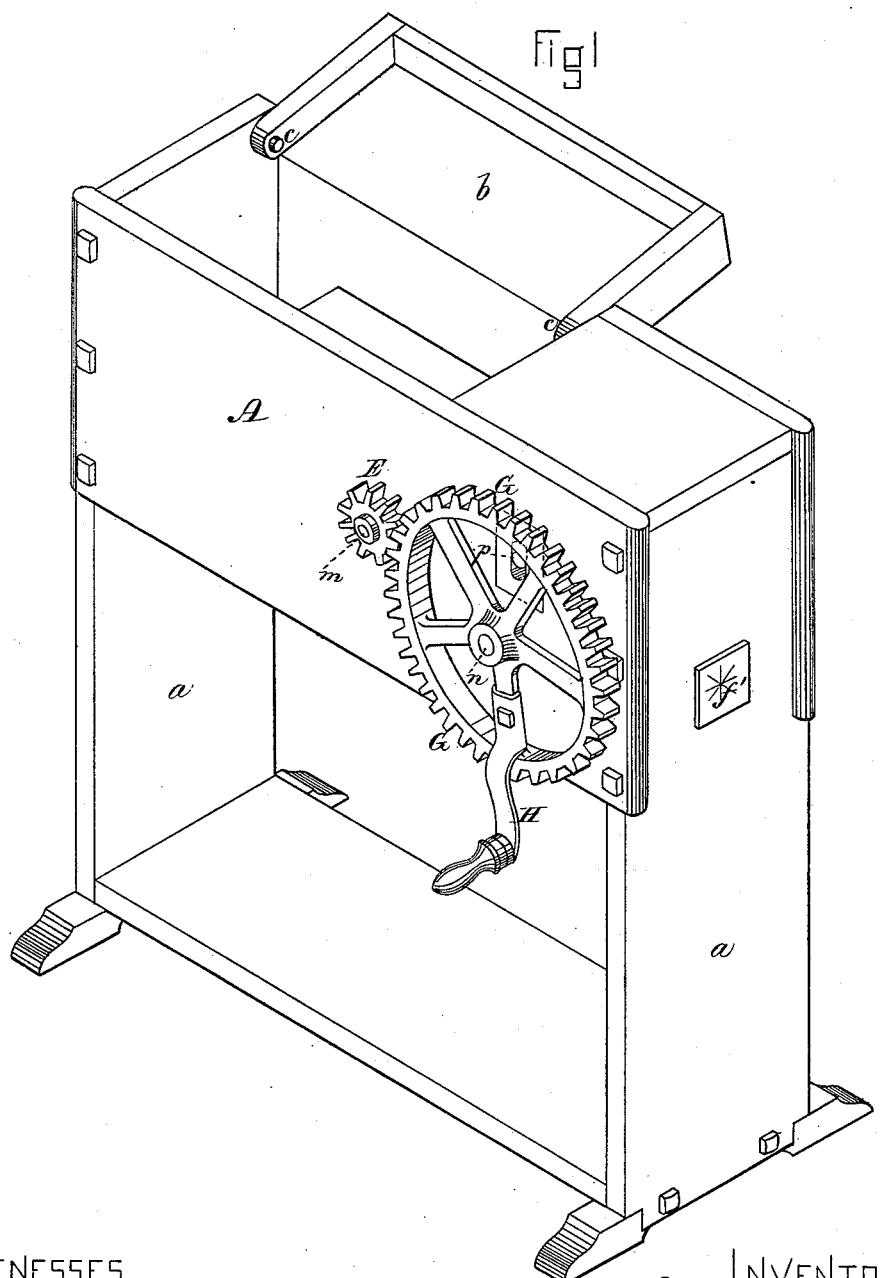

J. W. RICKER & T. S. LEWIS.
CORN SHELLER.

No. 253,629. Patented Feb. 14, 1882.

WITNESSES
W. A. Cambridge
Winfield S. Brown

INVENTORS
John W. Ricker
Tristram S. Lewis
per H. E. Teschemacher
Atty

UNITED STATES PATENT OFFICE.

JOHN W. RICKER AND TRISTRAM S. LEWIS, OF CHELSEA, MASSACHUSETTS.

CORN-SHELLER.

SPECIFICATION forming part of Letters Patent No. 253,629, dated February 14, 1882.

Application filed November 10, 1881. (No model.)

*To all whom it may concern:*

Be it known that we, JOHN W. RICKER and TRISTRAM S. LEWIS, citizens of the United States, residing at Chelsea, in the county of Suffolk and State of Massachusetts, have invented an Improvement in Corn-Shellers, of which the following is a full, clear, and exact description, reference being had to the accompanying drawings, making part of this specification, in which—

Figure 5:
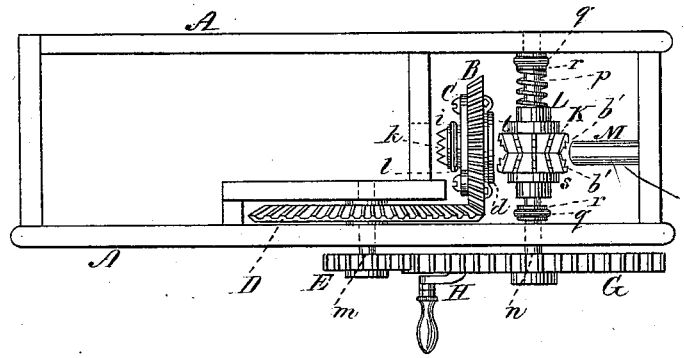
Figure 6:
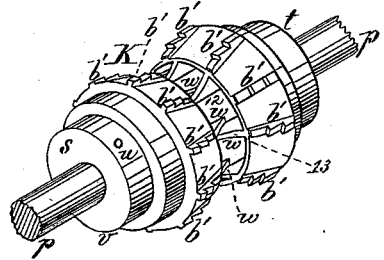

Figure 1 is a perspective view of a corn-sheller constructed in accordance with our invention. Fig. 2 is a longitudinal vertical section through the same. Fig. 3 is a transverse vertical section on the line $x$ $x$ of Fig. 2, enlarged. Fig. 4 is a front elevation of the shelling device enlarged. Fig. 5 is a plan of our improved corn-sheller with the upper portion of the casing removed. Fig. 6 is an enlarged perspective view of one pair of the feed-rolls detached.

Our invention relates particularly to an improvement in feeding devices for that description of corn-shellers in which the ear of corn is drawn by feed-rolls centrally between a series of spring-arms attached to a revolving ring, the arms being provided with teeth or projections which act upon and strip the kernels from the cob.

In machines of this description the feed-rolls heretofore used have only come into contact with a small portion of the circumference of the cob, and were consequently required to exert a great pressure thereon in order to create the necessary amount of friction to hold it against its tendency to be revolved on its axis by the rotating spring shelling-arms. This excessive pressure of the feed-rolls upon the cob is, however, exceedingly objectionable, as it greatly increases the power necessary to run the machine, and often causes the cob to be broken or pinched off at the point where it is griped by the rolls.

Our invention has for its object to overcome these difficulties; and it consists in feed-rolls, each made of two cone-shaped portions, provided with teeth or projections, one portion being fixed to the shaft and the other adapted to slide thereon away from the fixed portion against the resistance of a spring, in combination with certain details of construction, by which construction the surfaces of the feed-rolls are enabled to adapt or adjust themselves to the size or circumference of the cob, so as to come into contact with the greater part thereof, whereby the necessary amount of friction to feed the cob and also prevent it from rotating is created with much less pressure of the feed-rolls, and the power necessary to operate the machine proportionately diminished, while the liability of the cob's being broken off by the pressure or gripe of the feed-rolls thereon, as heretofore, is entirely avoided.

In the said drawings, A represents the outer casing of the machine, which is supported on legs $a$, a portion, $b$, of the top being hinged at $c$, so that it will form when thrown over to one side, as seen in Fig. 1, a hopper for the reception of the ears of corn to be shelled, which are thus supported in a convenient position to be taken up by the operator and passed one at a time through the machine.

B is a ring gear or wheel, which is provided on one side with a flange, $d$, which revolves in a bearing, $e$, at the upper end of a standard, $f$, secured firmly upon a transverse bar or cleat, $g$. To the front face of this gear B are pivoted, at equal distances apart, a series of three shelling-arms, C, which are each provided in front with a projecting portion, $i$, having a series of teeth, $k$, which are thus arranged around a circle, forming an aperture through which the ear of corn passes, the teeth, (which are kept in contact with the ear by the pressure of a rubber band-spring, $l$, encircling the portions $i$,) as they are rotated with the gear B, serving to remove or strip the kernels of corn from the cob as they (the teeth) are carried around the ear, a screw-thread, 10, formed on the inner surfaces of the portions $i$ of the shelling-arms, serving to draw in the cob and deliver it to the feed-rolls, to be presently described. The shelling-wheel B is rotated by a gear, D, which meshes therewith, and is secured upon a short shaft, $m$, carrying at its outer end a pinion, E, which is engaged by the large driving-gear G, which is mounted upon the end of the shaft $m$ of the lower feed-roll, I, and is rotated by hand-power applied to the crank H. The gear D is entirely inclosed within the casing in such a manner as to protect the operator from contact therewith when the hopper $b$ is thrown back.

I K are the feed-rolls, which are mounted upon horizontal shafts $n$ $p$ extending transversely across the machine, the bearings of the lower shaft, $n$, being fixed or stationary, while the journals of the upper shaft, p, are adapted to slide vertically in their bearings, which are elongated to admit this movement, the shaft p being drawn toward the shaft n to keep the rolls in contact with the cob by means of two rubber band-springs, q, (one at each end,) which pass over grooved collars or rings r slipped over the shafts n p, which rotate freely within them.

Each of the feed-rolls I K is formed of two hollow conical-faced portions, s t, the former being securely fixed upon its shaft by means of a pin, u, passing through its hub or flange v, while the latter, t, is adapted to slide upon its shaft away from or toward the portion s.

L L are spiral springs, which encircle the shafts n p between the portions t and the grooved collars r, and when the cob enters the space between the rolls I K the portions t are separated from the portions s against the resistance of these springs L, whereby the bearing-surfaces of these rolls are enabled to adjust or adapt themselves to the size and shape of the cob and take a bearing almost entirely around its circumference, thus increasing their tractive power.

On the inside of each of the hollow portions s t are a series of horizontal bars, w, which project inwardly from the circumference toward the center in the direction of their width, and extend out longitudinally beyond the edge of the conical face of one portion into the opposite hollow portion, the two series of bars, w, thus overlapping each other and interlocking in such manner as to cause the rotary motion of the portion s to be communicated to the portion t, which is loose upon its shaft. The outer portion of each bar w tapers to a point, as seen in Figs. 3 and 6, the inner edge, 12, being straight and the outer edge, 13, curved or inclined, and thus, when a large cob passes between the feed-rolls and the portions t are thereby widely separated from the portions s, those parts of the circumference of the cob not touched by the conical faces of the portions s t are brought into contact with the combined edges 13 of the interlocking bars w, the curvature or contour of which adapts them to fit closely around the cob at these points, and thus assist in drawing it through the machine, nearly the entire circumference of the cob, whether of large or small size, being thus griped by the feed-rolls under all circumstances, which is a great advantage, as it renders the machine much more reliable and effective in its action.

The conical faces of the portions s t of the feed-rolls are each provided with a series of notched projections or teeth, b', which take a firm hold upon the sides of the cob, and not only enable the rolls to draw it through the machine in the direction of its length without liability of slip, but also effectually prevent the cob from being rotated on its axis by the friction of the revolving shelling-arms C, this being an essential requisite to the successful operation of the machine.

Within the casing A are placed inclined partitions c' d', which serve to guide the kernels of corn as they fall from the cob to the exit or discharge aperture e' in the bottom of the casing.

M is a trough extending from a point close to the feed-rolls to an aperture, f', in the end of the casing, through which the cob is discharged from the machine.

The above-described machine is simple, cheap, and durable, and by the employment of feed-rolls constructed as above described the power required to operate the machine is reduced to a minimum, for the reason that as the acting-surfaces of the rolls readily adjust themselves to the size and shape of the cob they are enabled to take a much more extended bearing thereon, and consequently sufficient friction is created to hold the cob against all possibility of slipping in any direction with a much lighter spring-pressure on the rolls than has heretofore been required, while this reduction of spring-pressure also prevents any liability of the cob being cut into or crushed by the feed-rolls, as often occurs with the old construction.

What we claim as our invention, and desire to secure by Letters Patent, is—

1. In a corn-sheller, the shelling device, in combination with a pair of feed-rollers formed of a pair of conical-faced toothed portions, s t, one of each pair fixed upon its shaft and one of each pair sliding on its shaft, and the springs L, bearing against said loose portions, substantially as and for the purpose set forth.

2. In a corn-sheller, the combination of the feed-rolls I K, shafts n p, each of said rolls being composed of a portion, s, fixed upon its shaft, and a sliding portion, t, and springs L, bearing against the portions t, said rolls being also provided with the pointed bars w, projecting from each portion into the opposite hollow portion, said bars being provided with curved or inclined holding-edges 13, which fit around the cob when the portions t are separated from the portions s, and adapted to overlap and interlock with each other, whereby the rotary motion of the portions s is communicated to the portion t, all constructed to operate substantially in the manner and for the purpose set forth.

3. In a corn-sheller, the combination of the shelling device, the shafts n p, the latter movable in its bearings and adapted to be forced toward the former by springs q, the separable feed-rolls I K, having adjustable toothed bearing-faces, and interlocking bars w, having holding-edges 13, mounted upon said shafts n p, all constructed to operate substantially in the manner and for the purpose described.

Witness our hands this 8th day of November, A. D. 1881.

JOHN W. RICKER.
TRISTRAM S. LEWIS.

In presence of—
P. E. TESCHEMACHER,
W. J. CAMBRIDGE.